No. 625,869. Patented May 30, 1899.
M. G. F. BUCKLEY.
PLASTER BLOCK.
(Application filed Aug. 2, 1898.)
(No Model.) 2 Sheets—Sheet 1.
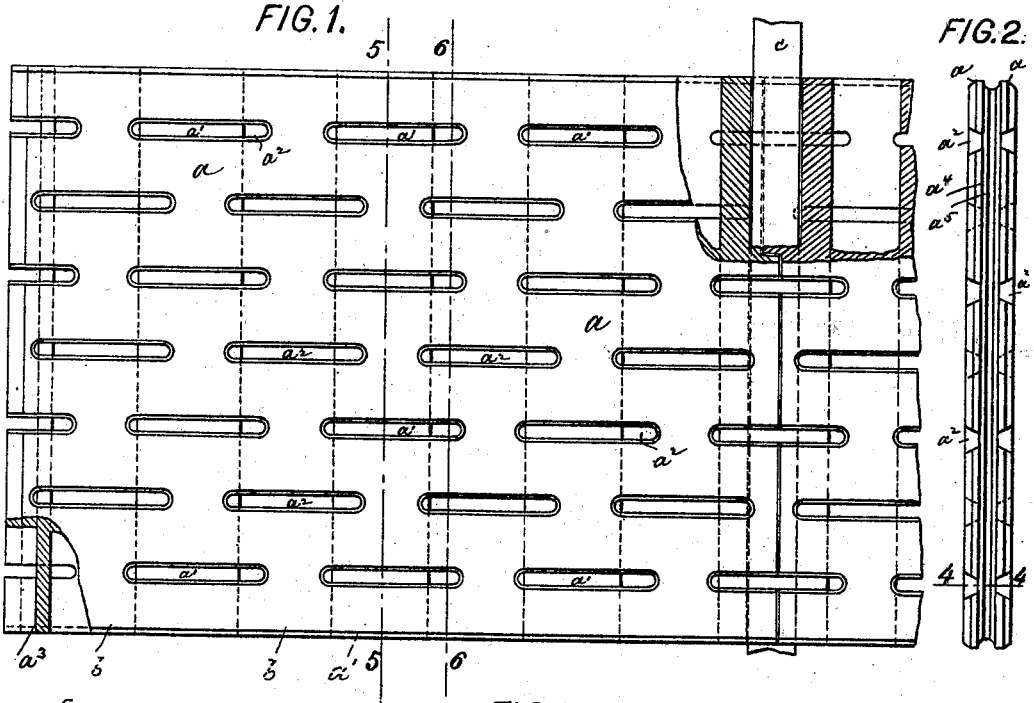
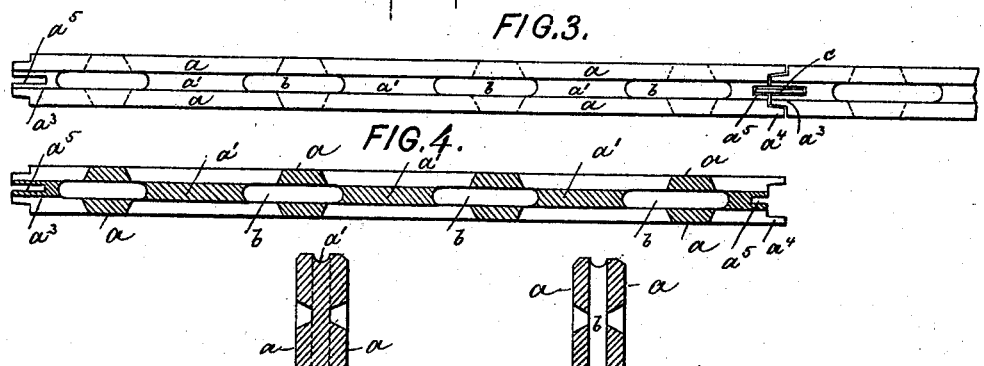
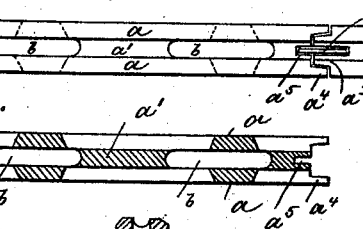
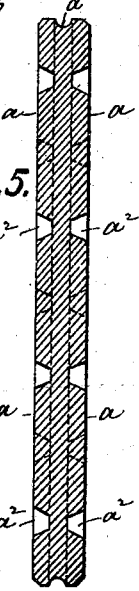
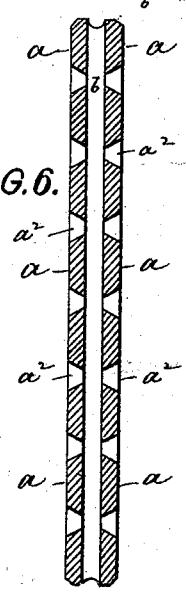
Witnesses:
John Becker
William Miller
Inventor:
Michael G. F. Buckley
by his attorneys
Roeder & Briesen
THE NORRIS PETERS CO., PHOTO-LITHO., WASHINGTON, D. C.

No. 625,869. Patented May 30, 1899.
M. G. F. BUCKLEY.
PLASTER BLOCK.
(Application filed Aug. 2, 1898.)
(No Model.) 2 Sheets—Sheet 2.
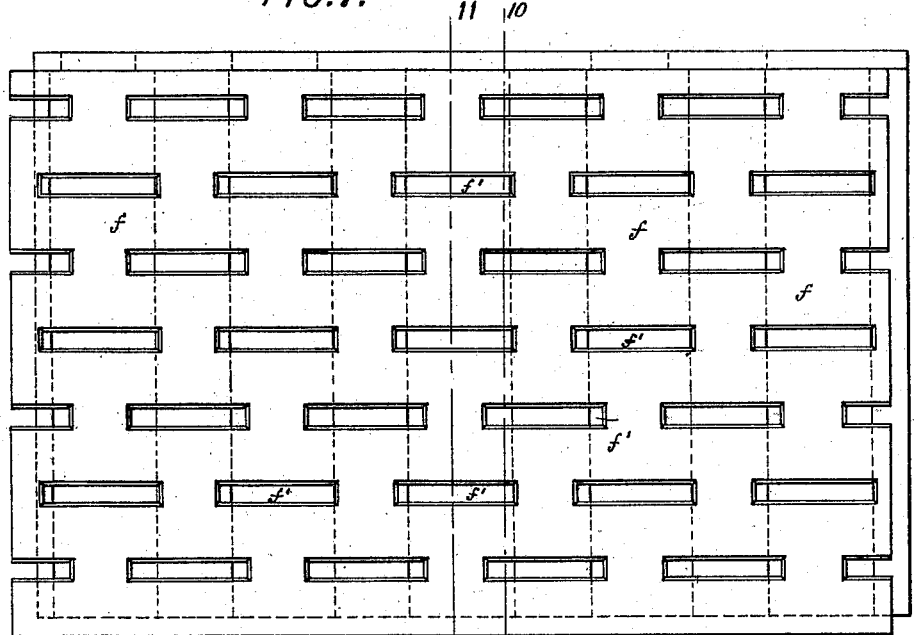
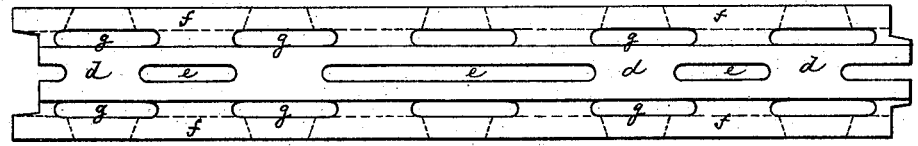
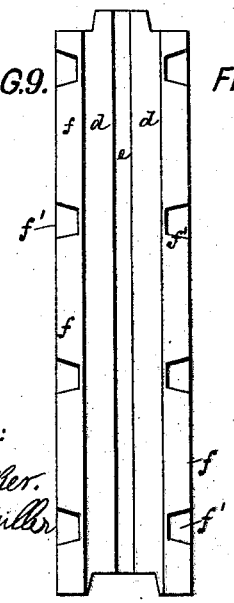 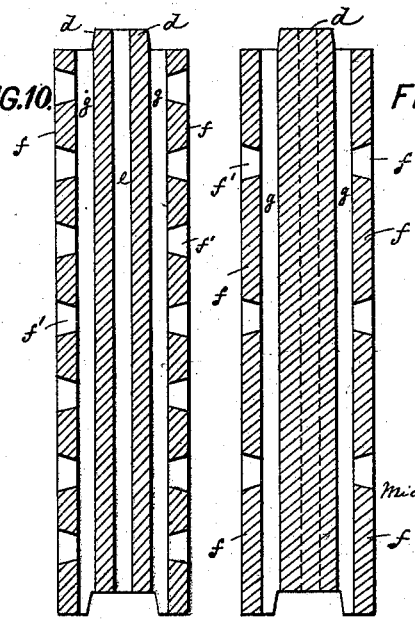
Witnesses:
John Becker.
William Miller.
Inventor:
Michael G. F. Buckley
by his attorneys
Roeder & Briesen

United States Patent Office.

MICHAEL G. F. BUCKLEY, OF NEW YORK, N. Y.

PLASTER-BLOCK.

SPECIFICATION forming part of Letters Patent No. 625,869, dated May 30, 1899.

Application filed August 2, 1898. Serial No. 687,479. (No model.)

*To all whom it may concern:*

Be it known that I, MICHAEL G. F. BUCKLEY, a citizen of the United States, and a resident of New York city, borough of Manhattan, State of New York, have invented certain new and useful Improvements in Plaster-Blocks, of which the following is a specification.

This invention relates to a plaster-block for partitions and walls which possesses a superior keying-surface for the plaster facing, deadens the sound, and offers superior means for connecting it to the adjoining blocks and to the iron uprights by which the blocks are supported.

In the accompanying drawings, Figure 1 is a face view, partly in section, of an "inside" plaster-block provided with my improvement. Fig. 2, an end view thereof; Fig. 3, a top view; Fig. 4, a section on line 4 4, Fig. 2; Fig. 5, a section on line 5 5, Fig. 1; Fig. 6, a section on line 6 6, Fig. 1; Fig. 7, a face view of an "outside" plaster-block; Fig. 8, a top view thereof; Fig. 9, an end view; Fig. 10, a section on line 10 10, Fig. 7; and Fig. 11, a section on line 11 11, Fig. 7.

With particular reference to Figs. 1 to 6, the plaster-block is made hollow, being composed of the two sides $a$ $a$, which are connected at suitable intervals by the interior ribs $a'$, all of course molded in one piece. The ribs $a'$ are suitably spaced and are shown to be arranged vertically, though they may obviously run in a different direction. By the arrangement described there are formed within the plaster-block a number of interior air-spaces $b$, that extend through the entire block from end to end and serve not only to lighten the structure, but also to deaden the sound. Each of the sides $a$ is provided with slots $a^2$ made, preferably, of elongated form and arranged transversely to the air-spaces $b$, the slots extending completely through the sides $a$ to open into such spaces. I prefer to arrange the slots $a^2$ in a staggered manner and make them somewhat longer than the width of the ribs $a'$. Thus some of the slots $a^2$ will communicate for their entire length with the air-spaces $b$, while others will communicate therewith only at one or both ends, according to the relative position of the ribs $a'$ and the slots. The slots $a^2$ constitute key-grooves for securely holding the mortar, cement, or other plaster facing with which the block is covered. The body of this facing will enter the key-grooves and will be also pressed in part through such grooves into the air-spaces $b$, so that an exceedingly firm attachment for the facing is provided. At the upright edges the plaster-blocks are provided with tongues $a^3$ and grooves $a^4$, so that the adjacent blocks may be properly joined. Within these tongues and back of the grooves the block is provided with laterally-opening slots $a^5$ for the reception of the iron ribs or uprights $c$, which serve to hold the block in place. These ribs will thus be entirely surrounded by the adjoining blocks, Fig. 3, after the partition has been put up and will be out of reach of the mortar.

In Figs. 7 to 11 the construction is shown to be adapted for heavy partitions or walls. Here an extra hollow center piece $d$ is formed with interior air-spaces $e$. The sides $ff$ are connected to the center piece $d$ by means of ribs, so as to form intervening air-spaces $g$. Each of the sides $f$ is provided with the transverse key-grooves $f'$, opening into the air-spaces $g$ in the manner and for the purpose hereinabove described with relation to the inside block, the entire block being, of course, molded in a single piece.

My improved plaster-block is strong, comparatively light, offers superior keying-faces, and prevents the frost from striking through.

What I claim is—

1. A hollow plaster-block having interior air-spaces and slotted sides, the slots of the sides opening into the interior air-spaces, substantially as specified.

2. A hollow plaster-block composed of two slotted sides, and inwardly-extending ribs to form interior air-spaces, into which the slots open, substantially as specified.

3. A hollow plaster-block having interior air-spaces, sides having slots that open into the same, interlocking edges, and slots in the said edges for receiving uprights, substantially as specified.

Signed by me, at New York city, New York, this 28th day of July, 1898.

MICHAEL G. F. BUCKLEY.

Witnesses:
F. V. BRIESEN,
WILLIAM MILLER.